W. HADDOCK.
Line-Fastener.

No. 167,610. Patented Sept. 14, 1875.

Witnesses:
Edw. W. Donn
Alexander Scott

Inventor:
Worcester Haddock
By Wilton C Donn
Associate Attorney

UNITED STATES PATENT OFFICE.

WORCESTER HADDOCK, OF PITTSBURG, PENNSYLVANIA, ASSIGNOR TO HIMSELF, HENRY GERDING, AND THOMAS JONES, OF SAME PLACE.

IMPROVEMENT IN LINE-FASTENERS.

Specification forming part of Letters Patent No. 167,610, dated September 14, 1875; application filed February 8, 1875.

*To all whom it may concern:*

Be it known that I, WORCESTER HADDOCK, of Pittsburg, in the county of Allegheny and State of Pennsylvania, have invented certain new and useful Improvements in Clothes-Line Fasteners; and I do hereby declare that the following is a full, clear, and exact description thereof, reference being had to the accompanying drawing, and to the letters of reference marked thereon.

My invention relates to an improvement in line-fasteners; and it consists of a hook provided with a clamp or tongue, pivoted in a vertical position, so as to swing clear of the bottom of the hook, and be drawn to or from it, for the purpose of clamping or unclamping the line automatically.

Figure 1:
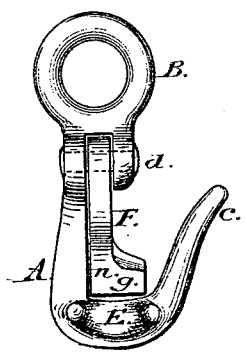
Figure 2:
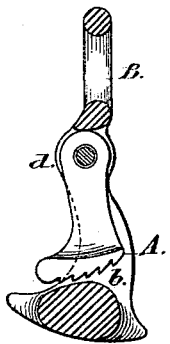
Figure 3:
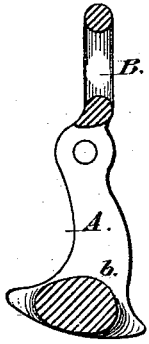
Figure 4:
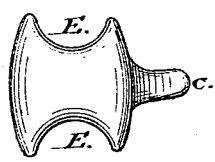
Figure 5:
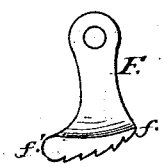
Figure 6:
Figure 7:
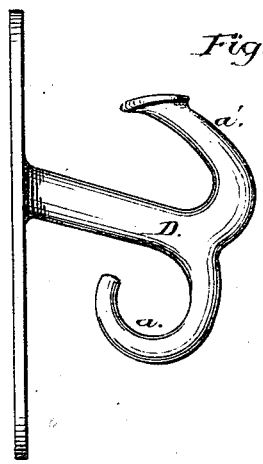
Figure 8:
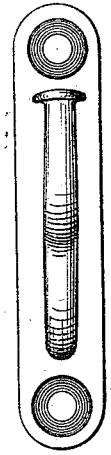

Figure 1 is a side elevation of the hook. Fig. 2 is a vertical section thereof, with the clamp. Fig. 3 is a vertical section with the clamp removed. Fig. 4 shows the bottom of the hook. Fig. 5 is a side elevation of the clamp. Fig. 6 is a rear elevation of the same. Figs. 7 and 8 exhibit the stationary double hook.

Similar letters of reference indicate corresponding parts in all the figures.

In the drawings, A represents the hook. The ring B is used to suspend it from the lower hook *a* of the stationary double hook D, or other suitable contrivance. The open end C is bent outward, to permit the line to be easily thrown over it. On either side of the hook are the semicircular guides E E, in which the line is caught, and prevented from slipping. The surface over which the line runs is inclined, so that the highest point thereof is at *b* on the right. F is the clamp or tongue, pivoted at *d*, from whence it hangs in a vertical line to the left of the point *b*, which serves as a stop to keep it from passing through the hook.

The form of the clamp is such that when suspended, its serrated end, which conforms nearly to the surface of the hook, swings clear, and the edge *f* is higher than the edge *f'*. This allows ample space between the part of the clamp that first strikes the line and the bottom of the hook, for the line to pass through, and at the same time engage the clamp. The projection *g*, on its upper surface, recedes from the shank *h*, so that when the line is thrown over the hook it will easily slip off when the clamp is moved aside.

The double hook D is designed to be fixed to a post or other suitable object, the lower hook *a* being used to suspend the fastener from, as before mentioned, while the upper hook *a'* may be used to catch the rope when it is desired to double it, or for any other purposes.

My invention is operated as follows: The line is formed into a loop, and thrown over the open end C. It thence falls down on the projection *g*. It is then drawn to the left with one hand, while the other hand keeps it taut. The movement to the left carries the clamp back, and the line slipping therefrom falls under it. The line is then drawn to the right, and, catching the clamp, carries it with it, and is firmly wedged against the base of the hook. The shape of the clamp and the base of the hook are such that a constantly-increasing pressure is exerted by any strain on the line.

To remove the line from the fastener, it is drawn to the left, which loosens the clamp, the right-hand side or end is thrown over the end C, and the line is released.

It will be observed that the action of the clamp is wholly automatic, both in fastening and unfastening the line, and in this respect it differs essentially from anything of the kind heretofore made or known.

I am aware that pivoted clamps have been used in connection with hooks to secure clothes-lines, &c., and I do not, therefore, claim such a device, broadly, but confine myself to the peculiarities of construction herein described.

Having thus described my invention, what I claim to be new, and desire to secure by Letters Patent, is—

The pivoted clamp F having the projection *g* constructed as described, in combination with the hook A, having the base inclined to the point *b* and the guides E E, substantially as hereinbefore described and set forth.

In testimony that I claim the foregoing as my own invention I affix my signature in presence of two witnesses.

WORCESTER HADDOCK.

Witnesses:
A. C. JOHNSTON,
B. L. JOHNSTON.